Sept. 15, 1953 — W. L. VAN DOREN — 2,652,143
CHAIN CONVEYER
Filed Feb. 8, 1951 — 2 Sheets-Sheet 1
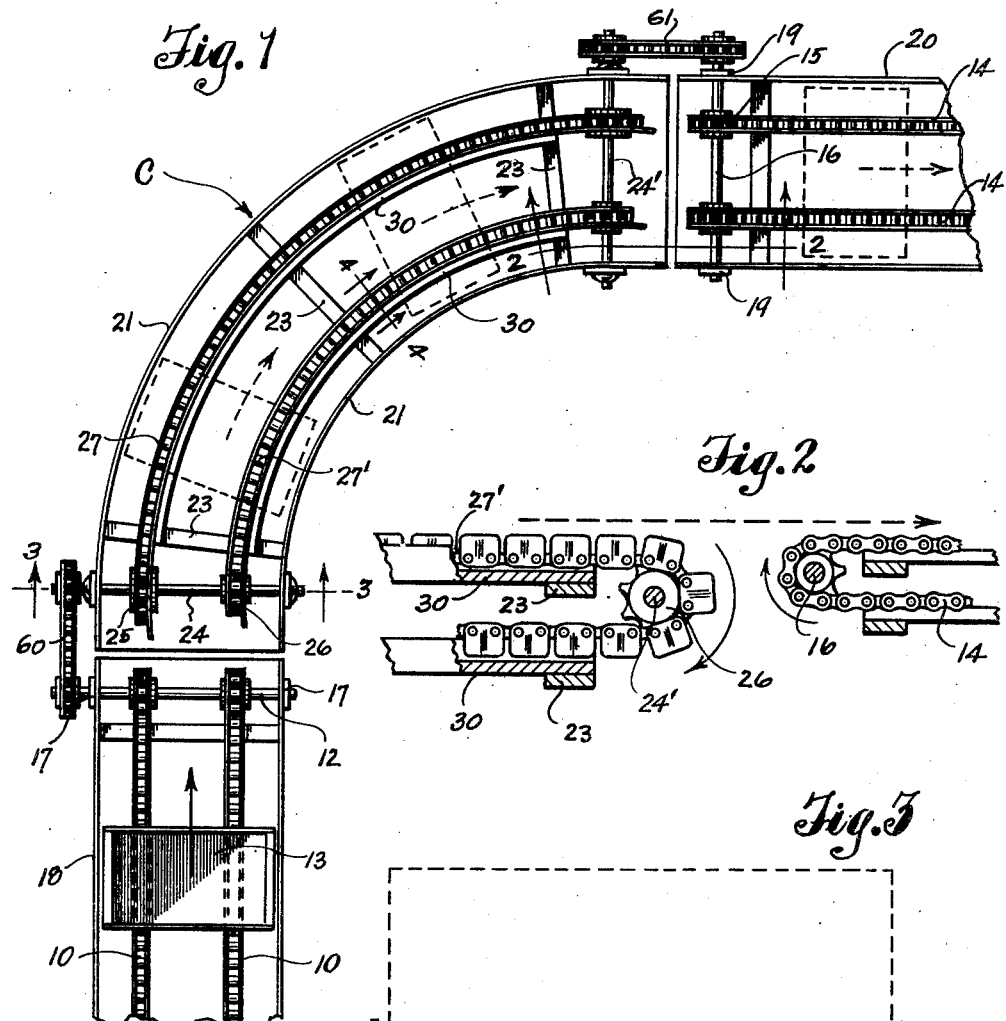
Inventor
WILLIAM L. VANDOREN
By Cook & Robinson
Attorney

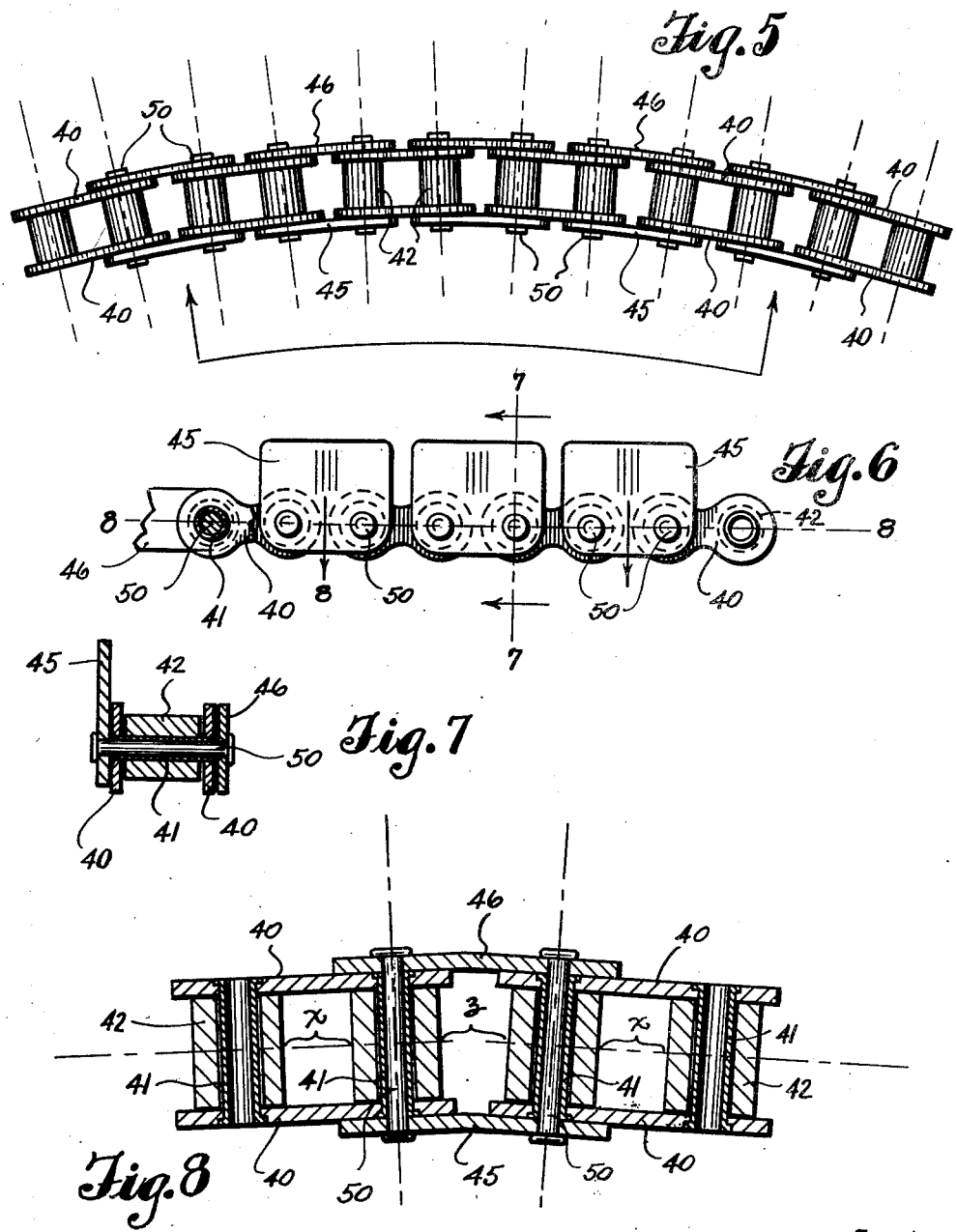

Patented Sept. 15, 1953

2,652,143

UNITED STATES PATENT OFFICE 2,652,143

CHAIN CONVEYER

William Louis Van Doren, Wenatchee, Wash.

Application February 8, 1951, Serial No. 209,990

6 Claims. (Cl. 198—182)

This invention relates to conveyors for the moving of boxes, cases, packages, and the like and it has for its principal object to provide a conveyor that is characterized by the use therein of a continuous link chain belt that has the article conveying run thereof operating along an arc, in a horizontal plane, with the links of the chain, and the pivot pins whereby they are hingedly joined together, lying flatly in the plane of the arc of travel.

It is also an object of the invention to provide a conveyor for the moving of boxes, cases, and the like thereon, for example, a conveyor as employed for the moving of boxes in a packing plant, and which conveyor comprises a pair of continuous chain belts, supported in spaced, parallel relationship and driven by sprocket wheels turning at the same angular speeds, with the top runs of the belts traveling at equal angular speeds, in parallel arcs in the same horizontal plane.

Yet another object of the invention is to provide a conveyor system, employing parallel spaced chain belts, with top runs thereof operating in the same horizontal plane, and in arcs of travel centered at a common point in the plane. Furthermore, the links of the chains are hinged together and have their hinge axes lying in the plane of the arc when moving therealong.

Still further objects of the invention reside in the details of construction of the conveyor chains, and in the combination of parts of the system and mode of operation of the conveyor as will hereinafter be fully described.

In accomplishing these and other objects of the invention, I have provided the improved details of construction, the preferred forms of which are illustrated in the accompanying drawings, wherein—

Fig. 1 is a plan view of a conveyor system including a curved section in which the novel features of the present invention are embodied.

Fig. 2 is an enlarged sectional detail, taken on line 2—2 in Fig. 1.

Fig. 3 is an enlarged cross-section, taken on the line 3—3 in Fig. 1.

Fig. 4 is an enlarged sectional detail of a chain and its guide rail, taken on the line 4—4 in Fig. 1.

Fig. 5 is an enlarged plan view of a part of the conveyor chain belt, showing its curved form of construction.

Fig. 6 is an enlarged side view of a section of the chain.

Fig. 7 is a cross-section on line 7—7 in Fig. 6.

Fig. 8 is an enlarged, horizontal section of links taken on the line 8—8 in Fig. 6.

Referring more in detail to the drawings—

In Fig. 1, I have illustrated a conveyor system including an arcuate section designated by reference character —C— in which the novel features of this invention are embodied. In this view, paired conveyor chain belts 10—10 are shown to be operating in parallel relationship about sprocket wheels 11—11, of the same diameter, fixed on a drive shaft 12. A box is designated at 13 as being advanced on these conveyor chains for delivery to the receiving end of the curved section —C— of the system. From the curved section, the box will be discharged onto a continuing section of the conveyor system which extends at a right angle to the direction of travel of the box as carried on the chain belts 10—10. This section comprises spaced, parallel chain belts 14—14 operating about sprocket wheels 15—15 on a supporting shaft 16.

The shaft 12 is herein shown to be revolubly contained in bearings 17—17 fixed in a frame structure designated by numeral 18. Likewise, the shaft 16 is revolubly contained in bearings 19—19 mounted on a supporting frame structure 20.

The curved section —C— is here shown to extend through an arc of 90°. However, the arc might be of more or less extent; the arc shown being one of a typical arcuate extent. The section —C— comprises an arcuately curved frame structure made up of opposite side plates 21—21, joined rigidly in spaced relationship by a base plate 22 and cross bars 23 located at spaced intervals therealong. Extended through the side plates, adjacent the opposite ends of this frame, are revolubly mounted cross shafts 24—24', and fixed on these shafts, are spaced sprocket wheels 25 and 26 about which conveyor chain belts 27—27' operate; these belts each being continuous and designed for travel of their top runs along arcuate paths lying in the same horizontal plane.

The arcuate top runs of each belt are supported for travel along guide rails 30 of the type of that shown best in cross section in Fig. 4. These guide rails are mounted on the cross bars 23 which extend between the opposite side plates of the frame structure. Each rail has a horizontal flange 30a, and a vertical flange 30b formed along that edge of the rail that is toward the inside of the arc. Mounted on the horizontal flanges of the guide rails are wear strips 32 on which the chains ride, as shown in Fig. 4.

The chains which comprise the belts are of a specific form of construction, that will be best understood by reference to Figs. 5, 6, 7 and 8.

Each chain is made up of a succession of identical "standard links" that are pivotally joined, end to end, by identical "special link sets." In Fig. 8, I have shown two of the "standard links" as hingedly joined by one of the special link sets.

Each standard link comprises equal opposite side plates 40—40', identical in size and joined rigidly in spaced parallel planes by parallel, tubular cross axles 41 directed through their opposite end portions and flanged at their ends for securement. Revolubly mounted on the cross axle 41, between the side plates, are rollers 42. Preferably the side plates are of the "hour glass" form as shown in Fig. 6, but not necessarily so.

The "standard links" of the chain are connected end to end by my special link sets, each set comprising an "inside link" and an "outside link." The inside links of these link sets are those which are applied to the chain at the inside of the arcuate curve, and they are designated by reference numeral 45. The outside links are those which are applied to the chain along the outside of the curve. They are designated by reference numeral 46.

The feature of the present invention resides in the making up of a conveyor chain belt, from a succession of pivotally joined standard links that will, by reasons of the design of their joining means, naturally assume and will follow along an arcuate path in a plane that is parallel to the plane of the axes of the links as has been shown in Fig. 5. To accomplish this result the links 45 and 46 are made in different lengths and preferably are angularly bent as has been shown best in Fig. 8.

The special links 45 and 46 comprised by each of the identical special link sets are embodied in the chain as shown in Fig. 5 and they are pivotally joined at their ends to the standard links by means of pivot pins 50 that are extended through the tubular axles 41 and are provided with flattened heads at their ends to hold them in place.

It will be understood by reference to Fig. 8, that the distance between the tubular axles in any standard link is the same as in the others. The links 45 and 46 of the identical link sets which join the standard links are of such lengths as to cause a desired curvature to the arcuate run of the chain, and also to maintain equal spacing of all the pivot axes along the central longitudinal pitch line of the chain. For example, the pitch line distance between the rollers of each standard link as designated by the bracketed space $x$ in Fig. 8, is equal to the pitch line distance designated by bracket space $z$ between the rollers of adjacent standard links. To accomplish this, the inside links of the link sets are made slightly shorter and the outside links slightly longer than the corresponding side plates of standard links.

The links 45 and 46 are bent along central transverse lines to give them the desired angular form, and the degree of the bend is dependent upon the length of the links used in the chain and radius of curvature of the arcuate path along which the top run of the belt is to travel.

It is also desirable for some uses that the inside links 45 be extended above the level of the belt, as has been shown in Figs. 4, 6 and 7. This is in order that these links will coact with the vertical flange 30b of the guide rail along which they travel to steady the operation of the conveyor, to hold it against tendency to tip and also to support the articles that are to be conveyed, above the guide rails and in the clear of the chain rollers. The relationship of the conveyed box 13 to the level of the conveyor chain is well shown in Fig. 3, and it is shown also in this view that the box is confined between the top edges of the side plates 21—21 of the frame structure.

In order that the two chains of the conveyor will travel at the same angular or arcuate rate, the sprocket wheels 25 and 26 over which the belts travel, are made in different diameters as required to accomplish this result and as has been shown in Fig. 3.

It is also shown in Fig. 3 that the supporting shaft 24 for the sprocket wheels is inclined at a degree that will cause the top edges of the sprocket wheels to be tangent to the same horizontal plane; that being the plane of travel of the arcuate top runs of the belts as supported by the arcuate rails 30. The shafts 24—24' are revoluble in bearings 55—55' secured to the side plates of the frame structure of the unit.

To drive the conveyor —C— in unison with the conveyors which bring boxes thereto and take them away, I have applied sprocket wheels of like size to the outer ends of the shafts 12 and 24 and extended a chain belt 60 thereover. Likewise sprocket wheels are applied to the outer ends of shafts 16 and 24' and a chain belt 61 extended thereover. All belts of the system will then be caused to move in a like direction.

Conveyors of this arcuate or curved type can be made with one or more chain belts, depending on requirements, and by reason of the provision of sprockets for driving the belts, when used as in Fig. 1, at the same angular speed, the packages conveyed thereon will retain their position without crawling to one or the other side, or turning on the belts.

The use of the guide rails, as shown in Fig. 4, is advantageous, and as an assurance against the chain tipping inwardly.

Conveyors of this kind have proven to be practical, in use in apple packing plants and would prove to be advantageous in any plant where packages or boxes are to be conveyed about corners or curves.

Having thus described my invention, what I claim as new therein and desire to secure by Letters Patent, is:

1. A sprocket chain belt of the character described comprising a succession of standard links of the same pitch line length, joined end to end by link sets with a like pitch line length; each standard link comprising equal opposite side plates, and parallel pivot pins extended through the ends of said side plates in spaced relationship; each of said link sets comprising an outside link and an inside link, which at their opposite ends are joined to the ends of the pivot pins of the standard links which they connect, and which, respectively, are longer and shorter than the pitch line length of the standard links and establish a uniform arcuate curvature to any run of the chain operating in a plane that is parallel to the plane of the hinge axes of the links in said run.

2. A chain belt conveyor having an article conveying run thereof supported for operation in a flat plane along an arc of uniform curvature, said belt comprising a succession of identical standard links joined hingedly together by like link sets, with the hinge axes of said links lying in the plane of the arc of curvature when moving therealong; said standard links having equal opposite side plates and having parallel pivot pins extended through their opposite end portions and each of said link sets comprising an inside and an outside link applied to the chain at the opposite sides of the standard links and mounted on the ends of said pivot pins of adjacent standard links; the links of said link sets that are at one side of the chain being shorter than at the other side to establish the arc of curvature along which the chain will operate.

3. A conveyor as recited in claim 2 wherein the links of the link sets are each angularly bent intermediate their ends to cause their end portions to flatly overlap with the side plates of the standard links to which they are attached.

4. The combination with a chain belt conveyor as recited in claim 2, of a supporting rail for the article conveying run of the belt having an upstanding guide flange and said links of said special link sets that are at the inside of the curve being adapted to engage flatly with said guide flange, and being extended above the said flange for the support of conveyed articles thereon.

5. A sprocket chain belt conveyor as in claim 2 including a supporting rail for the article conveying run thereof; said rail having a base flange on which the belt travels and a side flange higher than the links of the belt which sustains the belt against lateral pull toward the inside of the curve, and the links of said special link sets that are at the inside of the curve being extended above the level of the rail as article supporting means and adapted to bear flatly against the said side flange of the said rail to prevent belt tipping.

6. A sprocket chain belt of the character described comprising a continuous succession of pivotally joined links, each of said links comprising spaced, opposite side plates flatly overlapped at their ends with the corresponding side plates of adjacent links in the chain, pins extended through the overlapped end portions of the plates of adjacent links and effecting their pivotal connection; the links being equally spaced along the belt and the link plates at one side thereof being shorter than their companion link plates at the other side of the belt, whereby any part of the belt operating upon a plane surface with its pivot pins parallel to said surface will be caused to automatically assume a definite arcuate curvature.

WILLIAM LOUIS VAN DOREN.

References Cited in the file of this patent
UNITED STATES PATENTS

| Number | Name | Date |
| --- | --- | --- |
| 1,050,584 | Wilkens | Jan. 14, 1913 |
| 1,206,305 | Cowley | Nov. 28, 1916 |
| 1,841,592 | Edwards | Jan. 19, 1932 |
| 1,945,357 | Pierce | Jan. 30, 1934 |